United States Patent
Hall et al.

(10) Patent No.: US 8,251,434 B2
(45) Date of Patent: Aug. 28, 2012

(54) FASTENER COVER EXTENSION PROVIDING BUCKLING PATH DURING SIDE IMPACT

(75) Inventors: Ian Brewster Hall, Silver Spring, MD (US); Srinivas Sanikommu, Grosse Pointe Shores, MI (US); John Pinkerton, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 474 days.

(21) Appl. No.: 12/433,340

(22) Filed: Apr. 30, 2009

(65) Prior Publication Data

US 2010/0276956 A1   Nov. 4, 2010

(51) Int. Cl.
*B60J 5/04* (2006.01)
(52) U.S. Cl. .................... 296/146.7; 296/37.13
(58) Field of Classification Search ............. 296/146.7, 296/37.13
See application file for complete search history.

(56) References Cited

U.S. PATENT DOCUMENTS

| 4,794,668 A | 1/1989 | Lorence et al. |
| 5,702,144 A * | 12/1997 | Matsuura et al. ........... 296/37.13 |
| 6,409,249 B1 | 6/2002 | Han |
| 6,568,743 B1 | 5/2003 | Jayasuriya et al. |
| 6,802,544 B1 * | 10/2004 | Lane ........................ 292/336.3 |
| 2006/0026799 A1 * | 2/2006 | Vanderpool et al. ............ 16/412 |

OTHER PUBLICATIONS

"Fusion Delivers Advanced Protection for Changing Safety Landscape", Sep. 18, 2007, 5 pages, www.media.ford.com/products.

* cited by examiner

*Primary Examiner* — Dennis Pedder
(74) *Attorney, Agent, or Firm* — Shook, Hardy & Bacon LLP (57) ABSTRACT

A vehicle door construction having a 360° grab handle includes a fastener cover that conceals a fastener hole in an A-surface of the vehicle door and which provides a buckling path for the 360° grab handle. An L-shaped cover and a fastener hole configuration is provided in the lateral A-surface to reduce stiffness in the region and to absorb side impact loads.

9 Claims, 8 Drawing Sheets

FASTENER COVER EXTENSION PROVIDING BUCKLING PATH DURING SIDE IMPACT

TECHNICAL FIELD

The disclosed invention relates generally to vehicle door constructions and to grab handles for such door constructions. More particularly, the disclosed invention relates to a fastener cover which conceals a fastener hole in an A-surface of a vehicle door and which provides a buckling path for the 360° grab handle.

BACKGROUND OF THE INVENTION

Side impact events in vehicles have been identified as one of the top priorities for both research and regulation with government requirements continuing to become more stringent with new occupant sizes and test modes frequently being added to published regulations. Designers and manufacturers are thus constantly being challenged to rethink and often revise their approaches to several vehicle structures, particularly vehicle doors.

While the vehicle door includes several features which combine both functionality and design and which must be configured so as to minimize vehicle-inward intrusion of the elements in a side impact event, one such feature is the door grab handle. According to the known thinking, consideration as to whether or not to include grab handles on vehicle doors is often based on whether or not the grab handle will be situated in the impact zone. This careful consideration is made because a grab handle, by its very design, must have additional lateral walls that are also A-surfaces. Lateral walls increase the stiffness of the grab handle region which tends to have a negative affect on occupant performance.

As in so many areas of vehicle technology, there is room in the art of vehicle interior door design for an alternative configuration to known grab handle configurations that will help to avoid some of the limitations of known designs.

SUMMARY OF THE INVENTION

The present invention provides an alternative arrangement to known vehicle door handle and pull cup and support structure designs. According to the present invention, a vehicle door assembly is provided that comprises a door trim substrate, a map pocket cover attached to the door trim substrate, a lower A-surface associated with the door trim substrate, and a 360° door handle attached to the door trim substrate. Cut out areas are formed in the lower A-surface and in the cover whereby the cut out areas form a single cut out area. An L-shaped fastener cover having an extended second surface is fitted over the single cut out area. This arrangement minimizes the stiffness of the A-surface without sacrificing integrity needed to provide proper support for the 360° door handle.

In a side impact event, the door trim substrate is pushed vehicle inward. Almost simultaneously the L-shaped fastener cover separates in part from the lower A-surface as the lower A-surface strokes relative to the extended second surface of the L-shaped fastener cover, thus reducing substantially or entirely eliminating the vehicle-inward movement of the associated grab handle close-out.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

In the following figures, the same reference numerals will be used to refer to the same components. In the following description, various operating parameters and components are described for different constructed embodiments. These specific parameters and components are included as examples and are not meant to be limiting.

Figure 1:
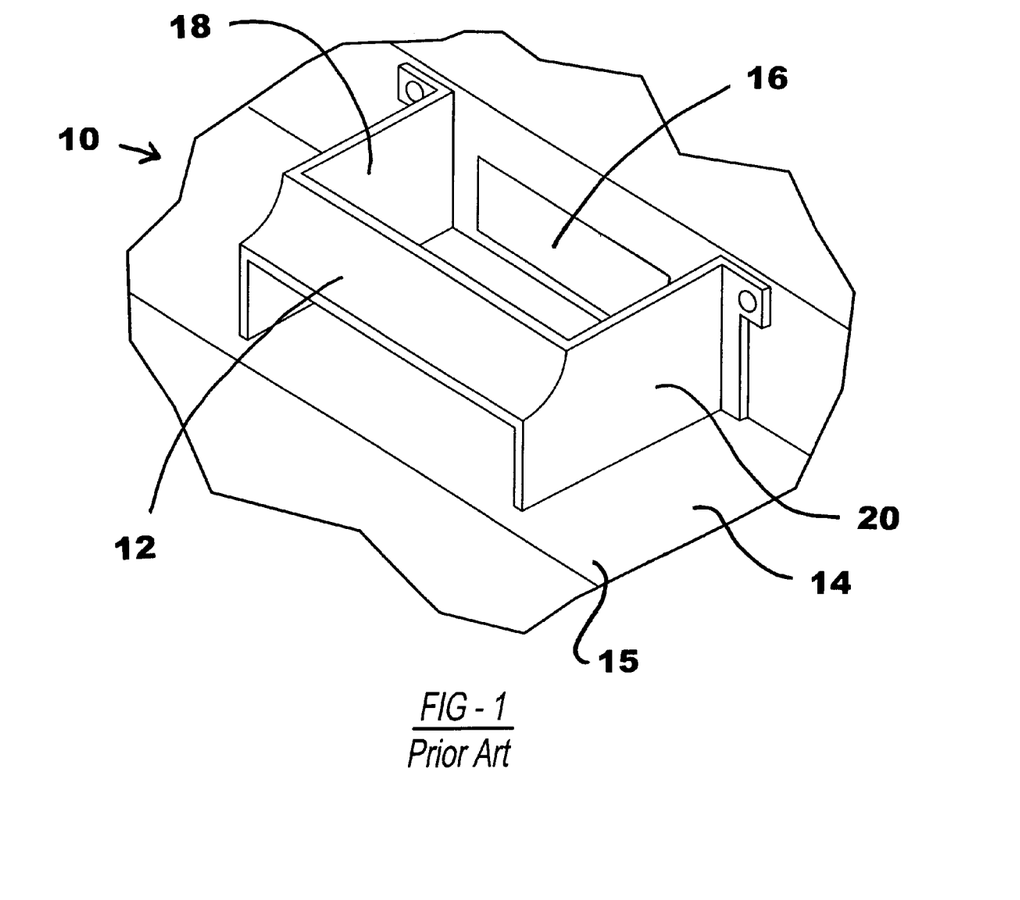
FIG. 1 is a perspective view of a grab handle close-out in position on a map pocket cover showing a fastener cover according to the prior art.
Figures 2, 3:
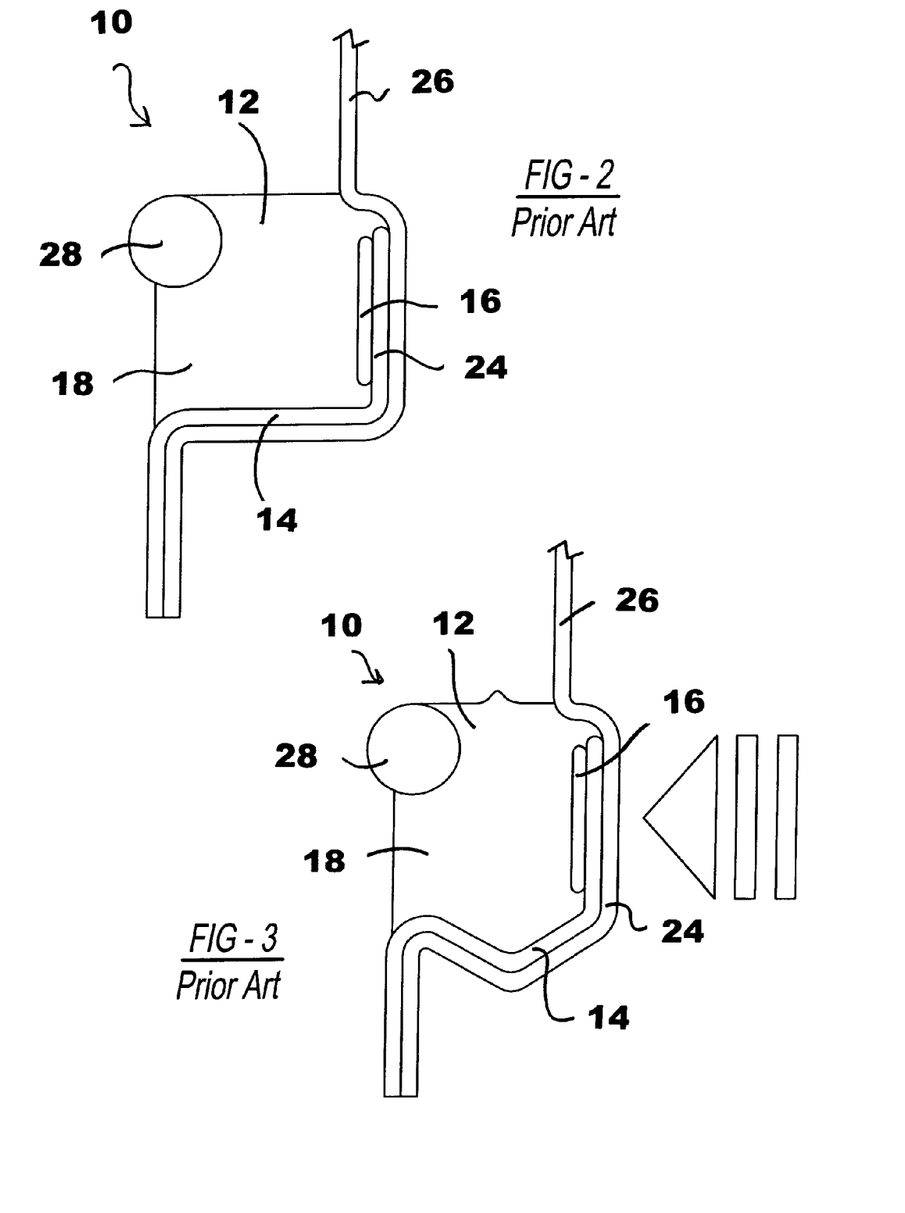
FIG. 2 is a section view of an arrangement of a grab handle relative to a map pocket cover and door trim substrate with a fastener cover prior to an impact event according to the prior art.
FIG. 3 is a sectional view similar to that of FIG. 2 but illustrating the arrangement of the prior art after an impact event.

The prior art approach to the provision of a grab handle and cover design is illustrated in FIGS. 1 through 3. With reference to FIG. 1, a perspective view of a grab handle arrangement on a vehicle door, generally illustrated as 10, is shown. More particularly, a perspective view of a grab handle close-out 12 in position relative to a lower A-surface 14 of a map pocket cover 15 and having a conventional fastener cover 16 is illustrated. The grab handle close-out 10 provides a base for the grab handle itself (not shown) and includes a forward lateral wall 18 and a rearward lateral wall 20. The fastener cover 16 is conventionally provided and is generally of an "I" shape. The fastener cover 16 is provided to cover underlying fasteners that are hidden thereby.

Referring to FIG. 2, a section view of the grab handle arrangement 10 according to the prior art is shown. As shown therein, the grab handle close-out 12 is shown relative to the lower A-surface 14 of the associated map pocket cover 15. Support for the map pocket cover 15 is provided by a door trim substrate 26. A grab handle 28 is attached to the grab handle close-out 12.

In a side impact event, the lower A-surface 14 is required, according to the prior art, to provide lateral to support to the grab handle, and thus increases stiffness of the overall grab handle region. This, as noted above, has a negative affect upon occupant performance in a side impact event. FIG. 3 illustrates this situation. If a side impacting force is applied to the vehicle door, the door trim substrate 26 is pushed vehicle inward. The lower A-surface 14, having characteristic stiffness, does buckle under the load as illustrated, but not before forcing the grab handle close-out 10 and its associated grab handle 28 vehicle inward toward the adjacent occupant.

Figure 8:
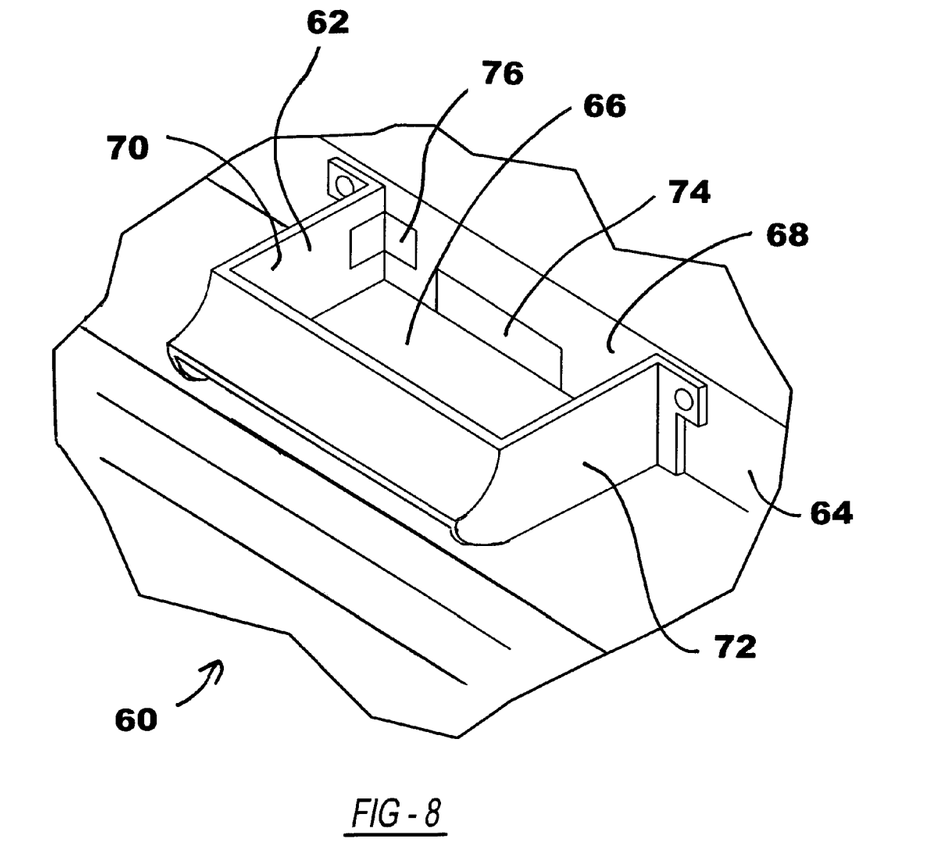
FIG. 8 is a perspective view of a grab handle close out in position on a map pocket cover showing a fastener cover according to an alternate embodiment of the disclosed invention.
Figure 9:
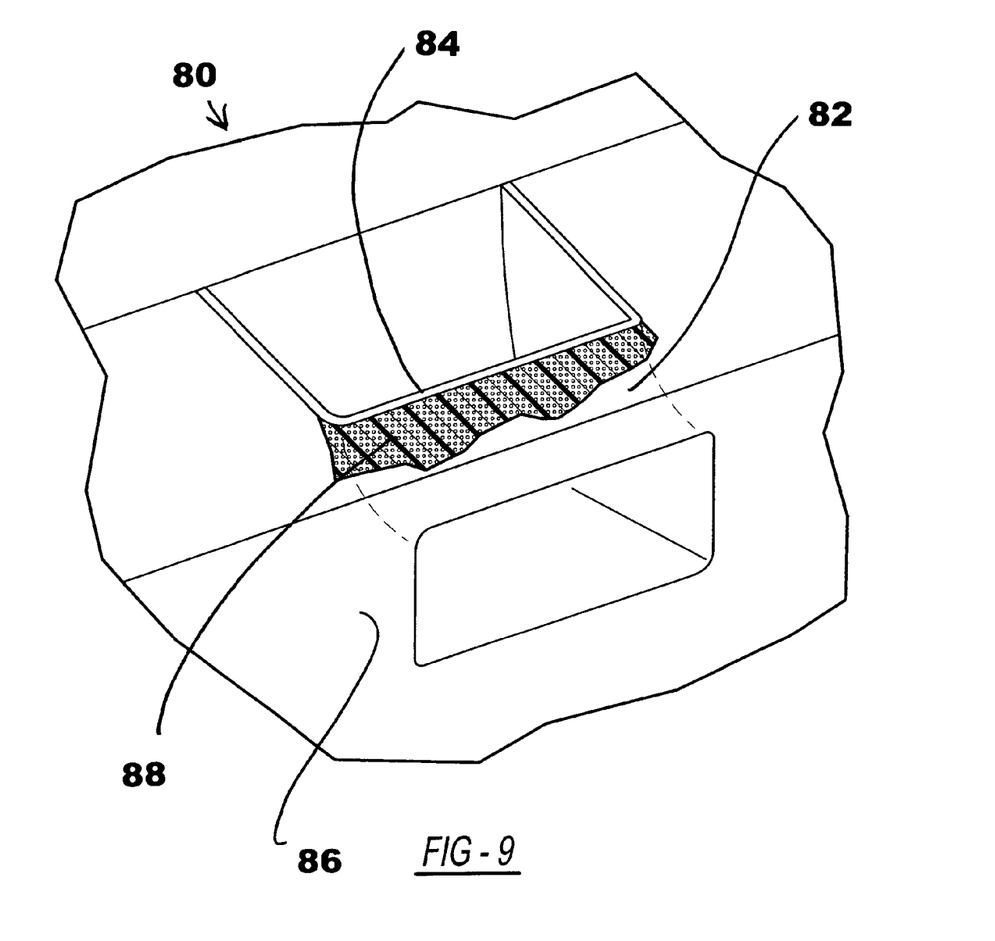
FIG. 9 is a perspective view of a grab handle arrangement according to an additional alternate embodiment of the disclosed invention illustrating the grab handle close out shown in shadow lines and illustrating part of the handle cover broken away to reveal the foam insert.
Figures 10, 11:
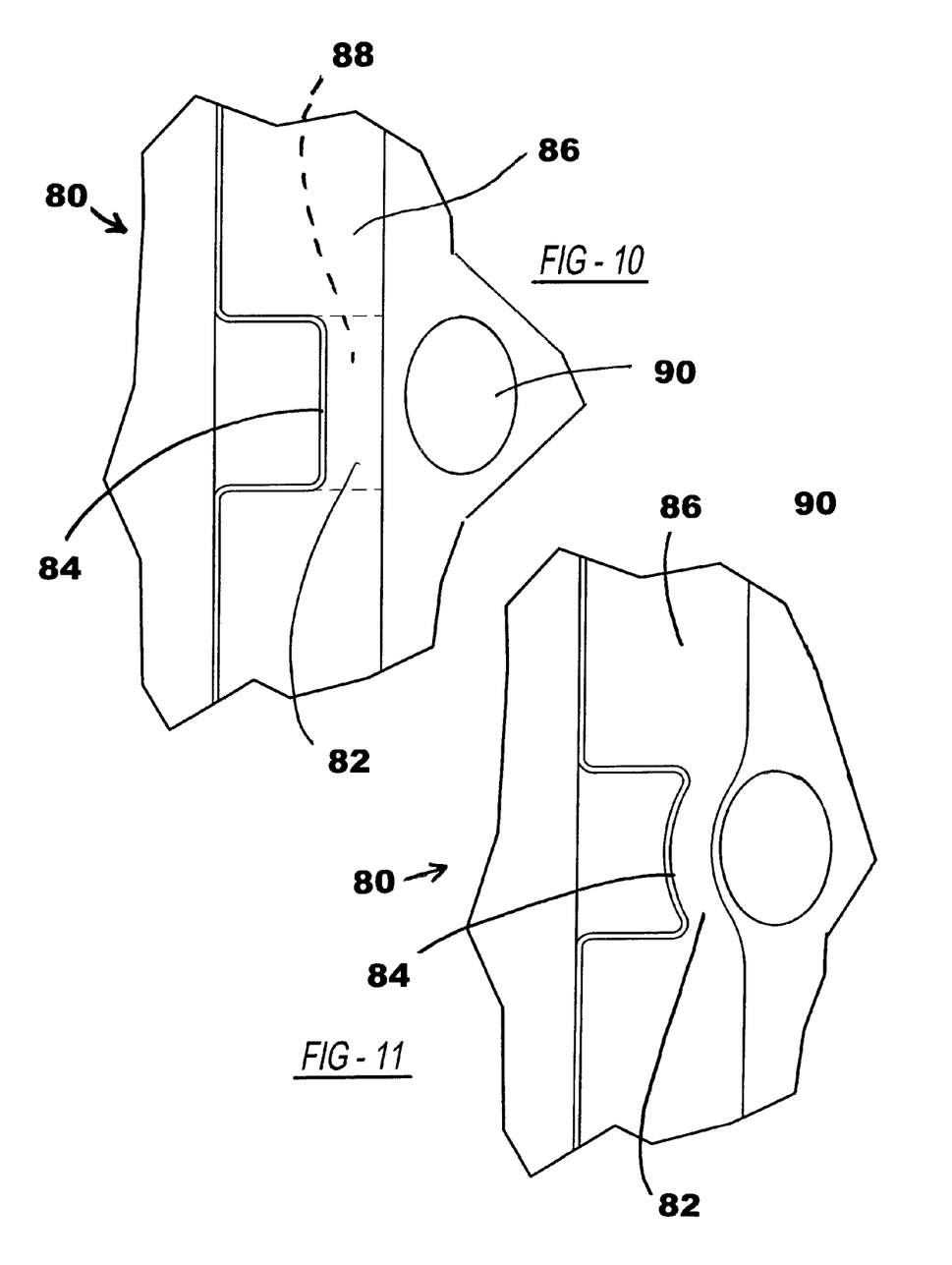
FIG. 10 is a partial top plan view of a grab handle arrangement incorporating the embodiment of FIG. 9 prior to an impact event.
FIG. 11 is a partial top plan view similar to that of FIG. 10 but illustrating the arrangement after an impact event.

The disclosed invention in its various embodiments overcomes the limitations generally associated with current grab handle design which retains the requisite integrity to support the grab handle but which minimizes the lateral stiffness of the adjacent area, thus minimizing vehicle-inward movement of the grab handle assembly in the event of a side impact. FIGS. 4 through 7 relate to a first preferred embodiment of the disclosed design. FIG. 8 relates to a second preferred embodiment of the disclosed design. FIGS. 9 through 11 relate to a third preferred embodiment of the disclosed design.

Figure 4:
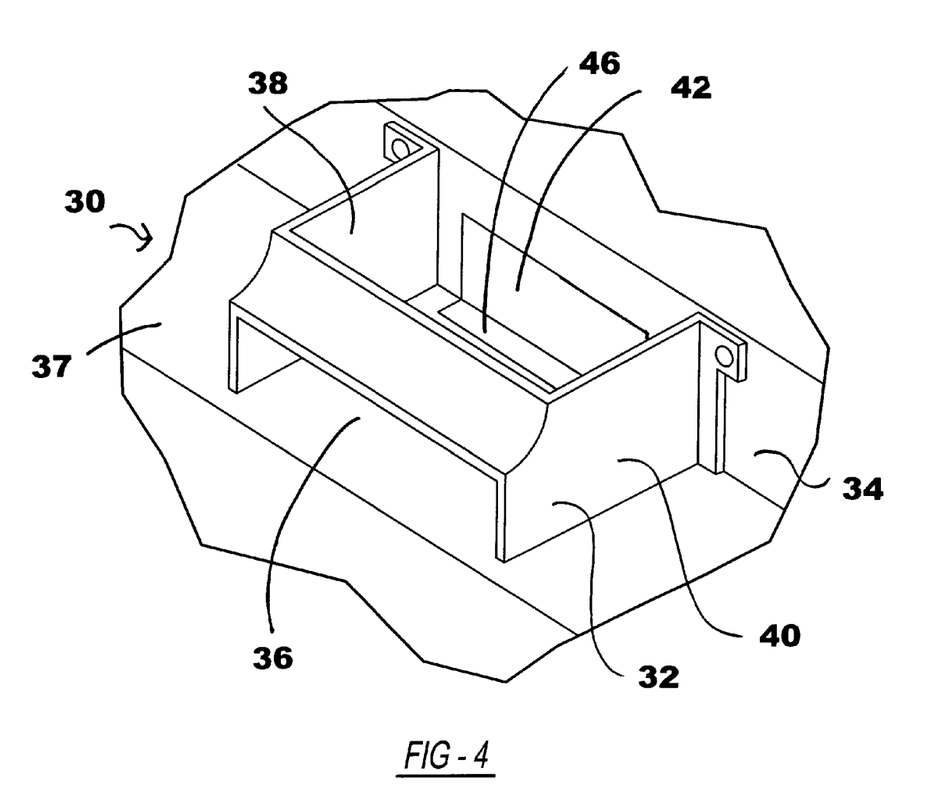
FIG. 4 is a perspective view of a preferred embodiment of a grab handle close-out in position on a cover according to the disclosed invention.
Figure 5:
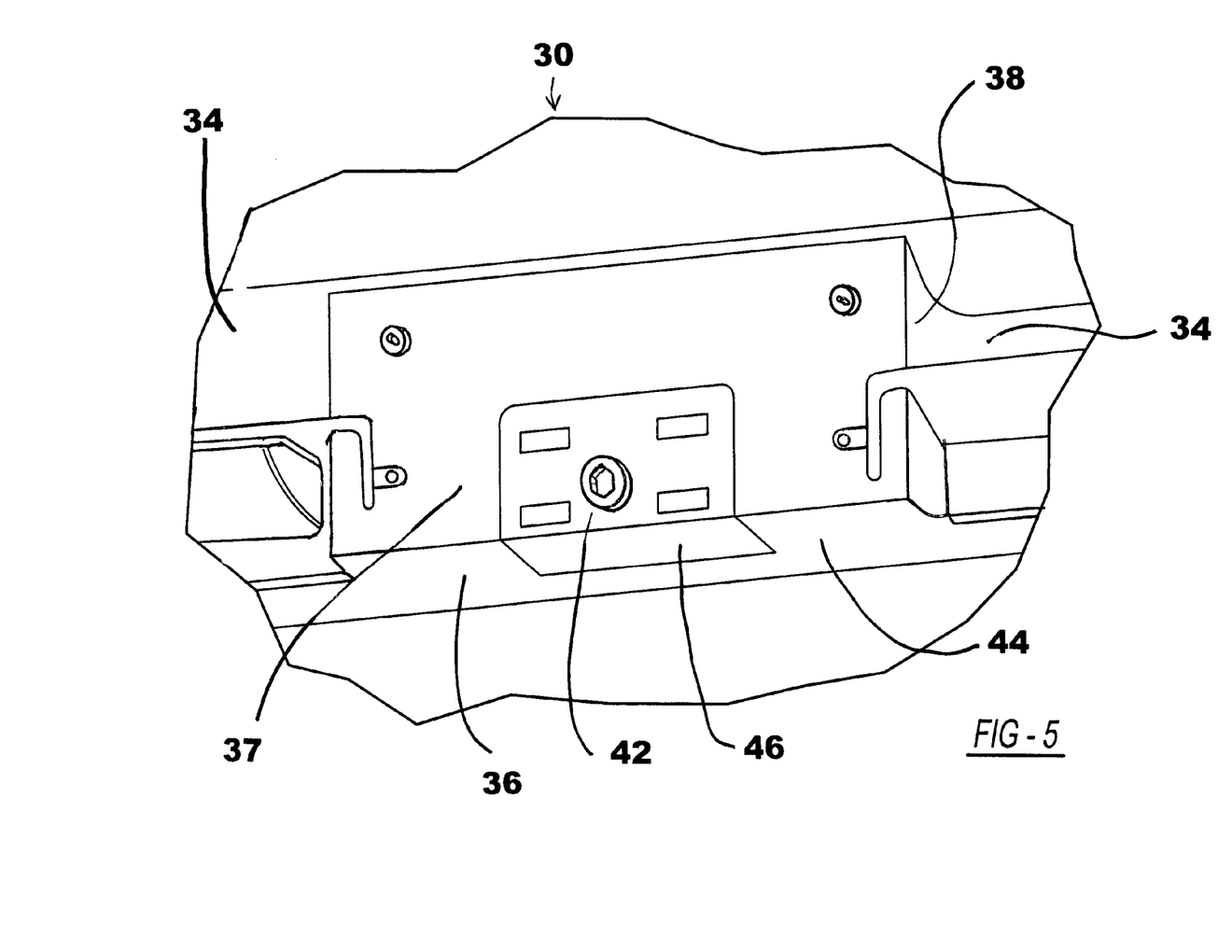
FIG. 5 is a back side perspective view of the fastener cover of the disclosed invention in place on the map pocket cover.

With respect to the first embodiment and with specific reference to FIGS. 4 and 5, a grab handle arrangement on a vehicle door, generally illustrated as 30, is illustrated. The grab handle arrangement 30 includes a grab handle close-out 32 attached to a door trim substrate 34. The door trim substrate 34 includes a lower A-surface 36 formed on a map pocket cover 37. The grab handle close-out 32 includes a forward lateral wall 38 and a rearward lateral wall 40.

An L-shaped fastener cover 42 is provided to cover the fastener hole on the A-surface 36. The L-shaped fastener cover 42 is an advancement over the known I-shaped cover 16 illustrated in FIGS. 1 through 3 of the prior art and adds to that standard cover an extended second surface 46. As best viewed in FIG. 5 which illustrates a back side perspective view of the grab handle arrangement 30, a section has been removed from the lower A-surface 36 to accommodate the extended second surface 46 of the L-shaped fastener cover 42, thus defining an aperture or hole in the lower A-surface 36. The aperture or hole reduces the lateral stiffness of the region.

Figure 6:
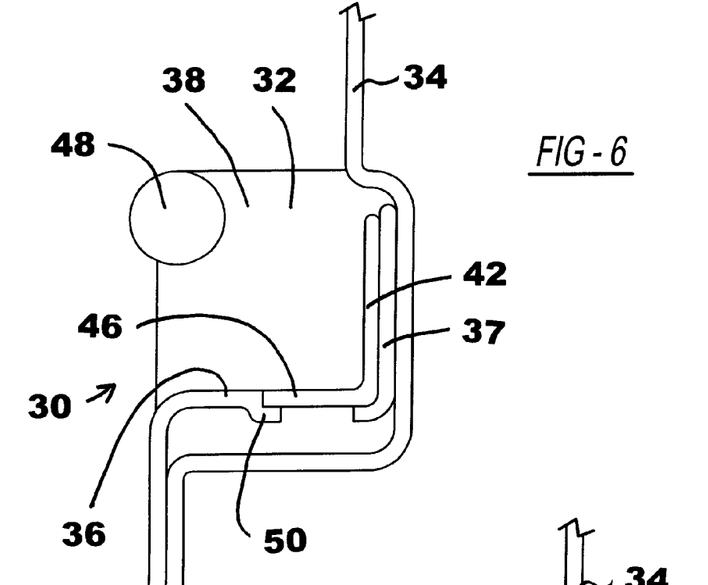
FIG. 6 is a sectional view of an arrangement of a grab handle relative to a map pocket cover and door trim substrate with a fastener cover according to a preferred embodiment of the disclosed invention.
Figure 7:
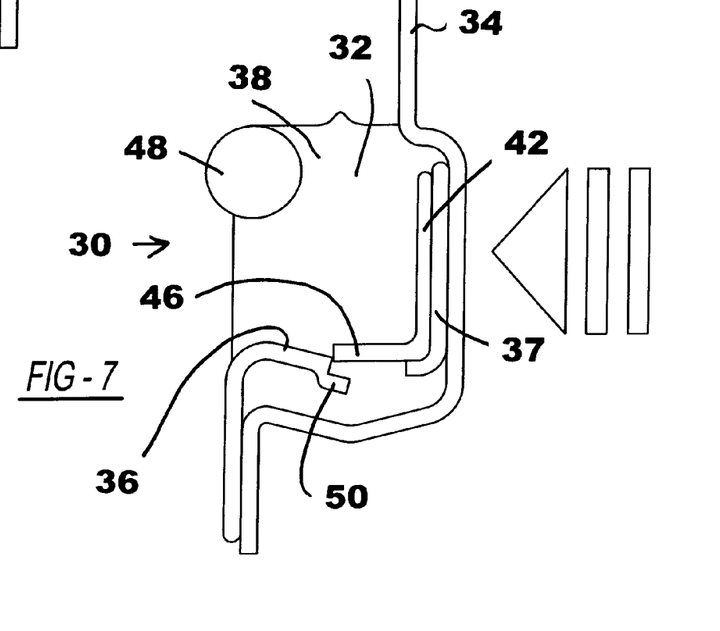
FIG. 7 is a sectional view similar to that of FIG. 6 but illustrating the arrangement after an impact event.

As illustrated in FIGS. 6 and 7, a grab handle 48 is attached to the grab handle close-out 32. In addition, and as also illustrated in FIGS. 6 and 7, the aperture or hole is defined in the lower A-surface 36 in the area generally below the extended second surface 46 of the L-shaped fastener cover 42. A lip 50 is optionally but preferably provided on the leading edge of the cut out area of the lower A-surface 36. The lip 50 provides support for the extended second surface 46 of the L-shaped fastener cover 42.

FIGS. 6 and 7 further illustrate how the grab handle arrangement 30 responds in a side impact event. In FIG. 6 the grab handle arrangement 30 is shown prior to the side impact event. The grab handle close-out 32 and its associated structures provide the integrity needed to serve the necessary function. The L-shaped fastener cover 42 provides the necessary coverage over the underlying fasteners (not shown) while interfering minimally or not at all in the integrity of the lower A-surface 36.

In a side impact event, as illustrated in FIG. 7, the door trim substrate 34 is pushed vehicle inward. Almost simultaneously the L-shaped fastener cover 42 separates in part from the lower A-surface 36 as the lip 50 of the lower A-surface 36 strokes relative to the extended second surface 46 of the L-shaped fastener cover 42, thus reducing substantially or entirely eliminating the vehicle-inward movement of the associated grab handle close-out 32.

The embodiment disclosed in FIGS. 4 through 7 and discussed in relation thereto illustrates a first, non-limiting embodiment of the invention. A second embodiment of the disclosed invention is set forth in FIG. 8 in which a grab handle arrangement for a vehicle door, generally illustrated as 60, is illustrated. The grab handle arrangement 60 includes a grab handle close-out 62 attached to a door trim substrate 64. The door trim substrate 64 includes a lower A-surface 66 formed on a map pocket cover 68. The grab handle close-out 62 includes a forward lateral wall 70 and a rearward lateral wall 72.

A conventional fastener cover 74 is provided to cover the fastener hole on the map pocket cover 68. A map pocket extension 76 may be provided in a cut out area between the forward lateral wall 70 and the map pocket cover 68. The cut out area reduces lateral stiffness of the forward lateral wall 70. In a side impact event the forward lateral wall 70 strokes relative to the map pocket extension 76. A map pocket extension (not shown) may also be provided in a cut out area between the rearward lateral wall 72 and the map pocket cover 68.

A third embodiment of the disclosed invention is set forth in FIGS. 9 through 11 in which a grab handle arrangement for a vehicle door, generally illustrated as 80, is illustrated. According to this embodiment the grab handle arrangement includes a 360° grab handle 82 having grab handle close-out 84 which is moved vehicle outward compared with known configurations. An armrest cover 86 is formed substantially over and around the grab handle close-out 84. The outward positioning of the grab handle close-out 84 results in a gap being formed between the armrest cover 86 and the grab handle close-out 84. A foam filling 88 is used to fill the gap left by the greater distance.

FIG. 10 illustrates the grab handle arrangement 80 prior to a side impact event with an occupant 90 adjacent to the grab handle 82. FIG. 11 illustrates the grab handle arrangement 80 after a side impact event wherein the grab handle 82 and the occupant 90 have come into contact. However, because of the presence of the foam filling 88 between the grab handle close-out 84 and the armrest cover 86 the energy of the impact between the occupant 90 and the grab handle 82 is substantially absorbed by the foam filling 88 and is dissipated as is known in the art.

Other embodiments of the disclosed invention may include the fastener cover extension hiding one or more apertures or holes in other areas of the grab handle A-surfaces. These lateral walls may include, but are not limited to, the armrest substrate, the grab handle close-out, the map pocket cover, and the door trim substrate.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:
1. A vehicle door assembly comprising:
a door trim substrate;
a door handle attached to said door trim substrate;
a cover attached to said door trim substrate;
a lower A-surface formed in the cover and extending generally perpendicularly from the cover, said lower A-sur- face formed between said door handle and said door trim substrate, said lower A-surface having a cut out area; and
a substantially L-shaped fastener cover having a first surface positioned against the cover and a second surface extending generally perpendicularly from the first surface and fitted over the cut out area of the lower A-surface.

2. The vehicle door assembly of claim 1, wherein said cover is a map pocket cover.

3. The vehicle door assembly of claim 1, wherein said door handle is a 360° door handle.

4. The vehicle door assembly of claim 3, wherein said grab handle close-out includes a rearward lateral wall and a forward lateral wall, said lateral walls being connected to said door trim substrate.

5. The vehicle door assembly of claim 1, wherein said cut out area of said lower A-surface includes a lip, and wherein the lip supports the second surface of the L-shaped fastener cover.

6. A vehicle door assembly comprising:
a door trim substrate;
a cover attached to said door trim substrate, said cover including a cut out area;
a door handle attached to said door trim substrate;
a lateral surface formed between said door handle and said door trim substrate, said lateral surface having a cut out area, said cut out area of said cover and said cut out area of said lateral surface being a single cut out area; and
a substantially L-shaped fastener cover at least partially fitted over said cut out area,
said door handle including a grab handle close-out, said grab handle closeout including a rearward lateral wall and a forward lateral wall, said lateral walls being connected to said door trim substrate, said cut out area of said lateral surface being a cut out area in at least one of said rearward and forward lateral walls.

7. The vehicle door assembly of claim 6 wherein said cover is a map pocket cover.

8. The vehicle door assembly of claim 6 wherein said door handle is a 360 0 door handle.

9. The vehicle door assembly of claim 6, wherein said L-shaped fastener cover includes a first surface and an extended second surface extending substantially perpendicularly from said first surface.

\* \* \* \* \*